Feb. 17, 1942.  J. S. ROSS ET AL  2,273,068
TRANSMISSION
Filed April 11, 1938   2 Sheets-Sheet 2
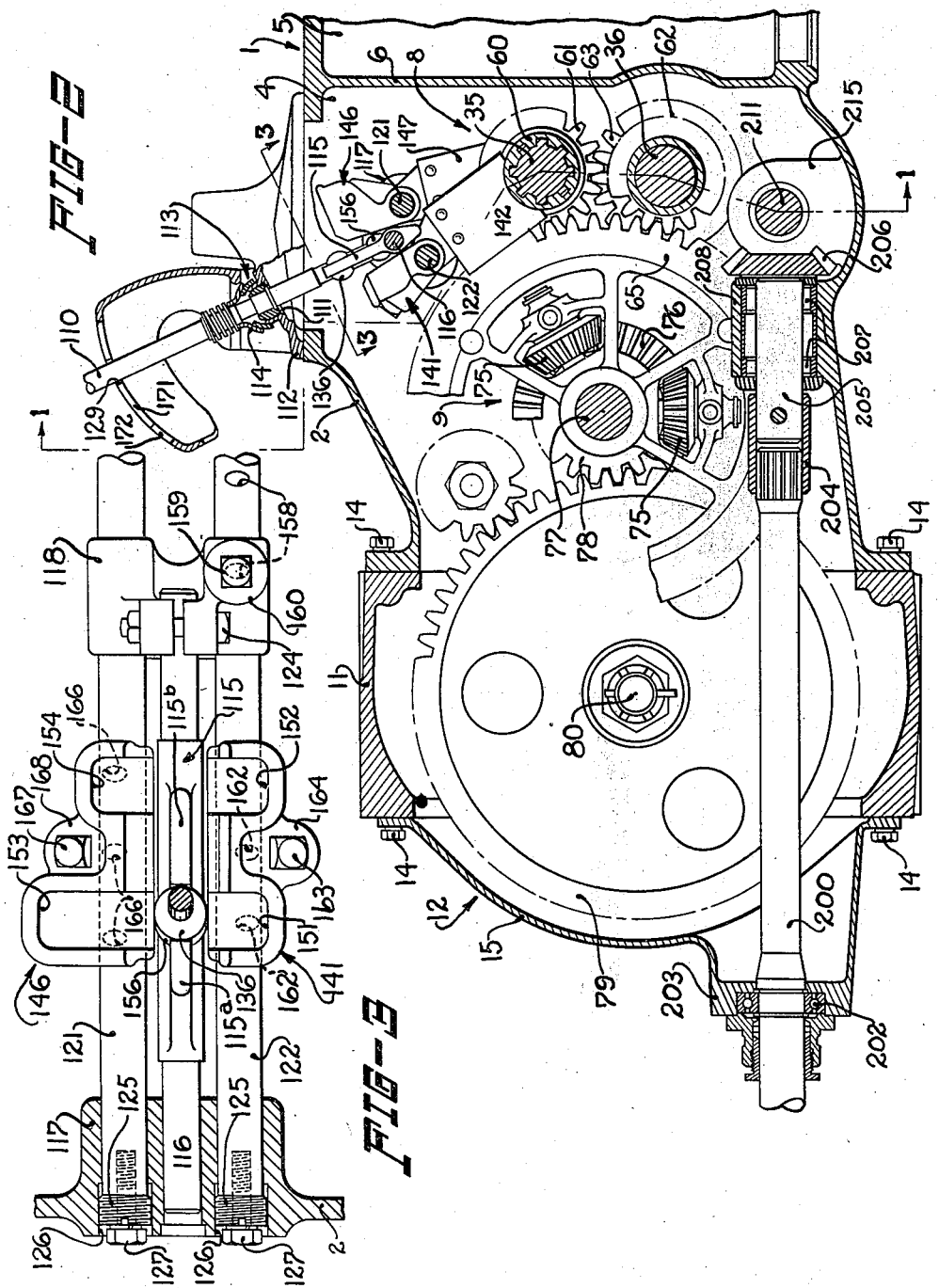

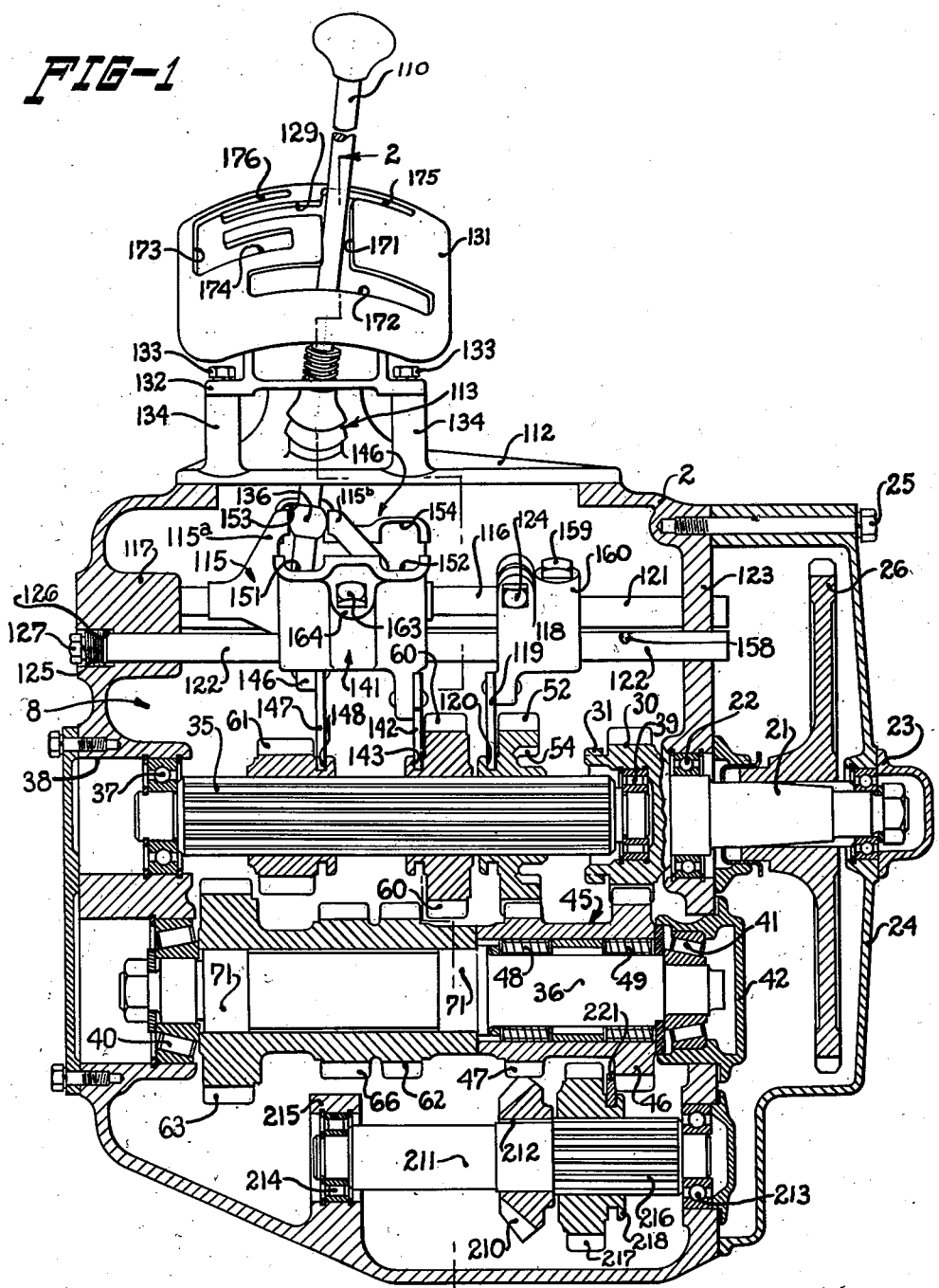

Patented Feb. 17, 1942

2,273,068

UNITED STATES PATENT OFFICE 2,273,068

TRANSMISSION

James S. Ross and Wayne H. Worthington, Waterloo, Iowa, assignors to John Deere Tractor Company, Waterloo, Iowa, a corporation of Iowa Application April 11, 1938, Serial No. 201,282

7 Claims. (Cl. 74—473)

The present invention relates generally to transmissions, and more particularly has to do with improvements in selective sliding gear transmissions making use of a two speed splined shaft which carries sliding pinions shiftable to secure different selected speeds, such as that illustrated and described in United States Letters Patent No. 2,103,543, issued December 28, 1937, to Elmer McCormick and Wayne H. Worthington. In such prior patented construction, however, in order to provide four different forward speeds and a reverse drive for the tractor it was necessary to provide two separate gear shift levers, one for controlling the selectively positioned pinions and the other for controlling the rate at which the two speed shaft is driven, and with that in view the present invention has for its principal object to provide controlling means whereby the same results may be obtained by the use of a single gear shift lever.

Other objects and advantageous features of the present invention will be apparent from the following description of the preferred embodiment thereof taken in connection with the accompanying drawings, in which:

Figure 1 is a transverse vertical section taken along the line 1—1 of Figure 2 through a transmission and controlling means therefor constructed in accordance with the principles of our invention;

Figure 2 is a vertical section taken along the line 2—2 of Figure 1; and

Figure 3 is a transverse section taken substantially on the plane of the line 3—3 of Figure 2, and showing our improved controlling mechanism.

Referring to the drawings, it will be seen that the transmission in which our present invention has been incorporated is shown as mounted in a tractor 1 having a main frame in the form of a housing 2 divided into a rear compartment 4 and a forward compartment 5 by a wall 6. The forward compartment 5 forms the crank case of the tractor motor that includes the usual transverse crank shaft thereof and associated parts (not shown). The rear compartment 4 includes the transmission unit, indicated in its entirety by the reference numeral 8, and the differential unit 9. As shown in Figure 2, the rear end of the compartment 4 is open to receive the central portion 11 of the rear axle housing 12 which is preferably of the banjo type and bolted as at 14 to the rear end of the main frame housing 2. The opening in the rear of the axle housing 12 is closed by a cover plate 15.

The transmission mechanism 8 is disposed in the rear compartment 4, as best shown in Figure 1, and is driven by a transmission driving member that includes a shaft 21 that is journaled at one end by bearing means 22 in one side wall of the housing 2 and at its other end by bearing means 23 in a cover housing 24 bolted, as at 25, or otherwise suitably secured to the main frame housing 2, as best shown in Figure 1. The shaft 21 is driven by a gear 26 suitably splined or otherwise secured thereon, and the gear 26 is driven from the tractor motor by driving mechanism (not shown) of any suitable type, such for example as that shown and described in the above mentioned McCormick and Worthington patent.

Formed at the inner end of the driving shaft 21 is a gear 30 having a plurality of laterally disposed external clutch teeth 31 on its inner side, the purpose of which will be hereinafter described, and the driving shaft 21 and the gear 30 constitute a motor driven member that is actuated by the tractor motor for driving the several parts of the transmission mechanism 8. The transmission mechanism includes a splined shaft 35 disposed in axial alignment with the driving shaft 21, and an auxiliary drive shaft or countershaft 36 is disposed below and parallel to the splined shaft 35. The shafts 35 and 36 are disposed transversely of the frame housing 2 and in parallelism with the transverse crank shaft of the motor (not shown). The left hand end of the splined shaft 35, as viewed in Figure 1, is journaled in bearing means 37 supported in an opening 38 in the side wall of the housing 2, and the opposite end of the shaft 35 is journaled in bearing means 39 supported in a recess in the inner face of the gear member 30. One end of the parallel shaft 36 is journaled in a bearing 40 supported in an opening in one side of the frame housing 2, and the opposite end of the shaft 36 is journaled in a bearing 41 supported in a cap 42 removably fixed over an opening in the opposite side of the housing 2.

As shown in Figure 1, the shaft 35 is splined for practically its entire length for a purpose which will hereinafter appear, and this shaft is referred to herein as a two-speed shaft because it may be driven at either of two speeds through driving means associated with the driving gear 30 of the motor driven member. This means includes a compound gear 45 having axially spaced gear sections 46 and 47 and supported by bearing means 48 and 49 on one end of the auxiliary shaft 36. The larger gear section 46 of the compound gear 45 is in constant mesh with the driving gear 30, and slidably but not rotatably mounted on the two-speed shaft 35 at the end thereof adjacent the compound gear 45 is a pinion 52 provided with internal splines that engage the splines on the shaft 35. This pinion may be so positioned that its teeth engage the other gear section 47 of the compound gear 45, and the pinion 52 is shown in that position in Figure 1. The pinion 52 is provided with a set of internal clutch teeth 54 that are adapted to engage the external clutch teeth 31 of the driving gear 30 whereby, when the pinion 52 is moved to the right as viewed in Figure 1, the splined shaft 35 may be directly connected to the driving shaft 21. The relative diameters of the gears 30, 46, 47 and 52 may be proportioned in any manner desired, but preferably the gear portion 46 is made larger than the gear portion 47 and the pinion 52 is made larger than the gear portion 47 whereby these parts constitute an underdrive for the splined shaft 35 when they are arranged in the position shown in Figure 1, the shaft 35 being driven at a higher speed when the clutch teeth 31 of the driving gear 30 engage the internal clutch teeth 54 of the pinion 52.

The splined shaft 35, which may be driven from the motor driven member 21—30 at either of two speeds according to the position of the pinion 52 which is controlled by means that will be hereinafter described, carries two driving pinions 60 and 61 that are provided with internal splines engaging the splines on the shaft 35, whereby the two pinions 60 and 61 are slidable but not rotatable with respect to the shaft 35. The positions of the pinions 60 and 61 on the shaft 35 are controlled by gear shifting means which will be described hereinafter. The auxiliary shaft 36 carries a pair of driven pinions 62 and 63 fixed thereon by any suitable means, and said pinions are positioned so that they may be engaged, respectively, by the driving pinions 60 and 61 when the latter are selectively shifted as hereinafter described. The differential mechanism 9 includes a ring gear 65 (Figure 2) mounted for rotation in the rear compartment 4 in a position between the driven pinions 62 and 63, and adjacent the driven pinion 62 is a third driven pinion 66 so positioned and arranged as to be in constant mesh with the ring gear 65 of the differential 9. The position of the ring gear 65 with respect to the driven pinion 66 mounted on the shaft 36 and the slidable driving pinion 61 splined on the shaft 35 is such that the pinion 61 may be shifted optionally into engagement with either the driven pinion 63 to provide either one of two forward speeds, as will be hereinafter more fully described, or directly into engagement with the ring gear 65 to provide reverse drive. The driving pinion 60 may be shifted from a neutral position, shown in Figure 1, into a position in engagement with the driven pinion 62 to provide either one of two forward speeds higher than that provided when the pinion 61 meshes with the pinion 63, as will hereinafter more fully appear.

It may be well to point out here that while the driven pinions 62, 63 and 66 may be separately formed and secured to the shaft 36 in any suitable manner, in the preferred construction illustrated in Figure 1 said pinions are integrally formed in one compound pinion that is secured to the shaft 36 by pressing it on a pair of raised portions 71 provided on the shaft, thus making it unnecessary to provide splines or other means for securing the pinions to the shaft and spacing means for holding said pinions in proper spaced relation on the shaft.

The differential 9, the ring gear 65 of which is driven by the pinion 66, is of conventional construction, and preferably includes three bevel pinions 75, only two of which are shown in Figure 2. The bevel pinions 75 are suitably mounted in the ring gear 65, as best shown in Figure 2, and the ring gear is fixed on a shaft 77 that is journaled in bearings (not shown) carried on opposite sides of the frame housing 2. The bevel pinions 75 are connected by differential gears 76 and drive pinions 78 to drive gears 79 (one of which is shown in Figure 2) secured on the inner ends of the drive axles 80. Such a driving means is shown in the above mentioned McCormick and Worthington patent, and as the present invention is not primarily concerned with such driving means it is not believed necessary to fully illustrate and describe the same herein.

Coming now to the gear shifting control mechanism with which my present invention is more particularly concerned, the slidable driving pinions 60 and 61 and also the slidable pinion 52 are shifted by means of a single operating or gear shifting lever 110 which extends through an opening 111 in a cover plate 112 of the transmission 8, and the lever 110 is supported from the cover 112 by means of a conventional ball and socket connector 113. A spring pressed cover 114 holds the gear shift lever in place. It will be remembered that the splined shaft 35 can be driven at either of two speeds, the lower of which is obtained through the compound gear member 45 from the driving gear 30 to the pinion 52, and the higher of which is obtained by moving the pinion 52 out of mesh with the gear portion 47 of the compound gear 45 and into direct clutching engagement with the driving gear 30. The means for shifting the pinion 52 by operation of the gear shifting lever will now be described.

A gear shifter including a yoke 115 is supported on and fixed to an axially slidable shaft 116 supported at one end in a boss 117 provided in one side wall of the housing 2 and has a shifter fork 118 fixedly secured as by a clamping bolt 124, to the other end thereof, as best shown in Figure 3. The shifter fork is provided with a bifurcated plate 119 that engages in a groove 120 formed in the hub of the pinion 52 (see Figure 1). The shifter fork 118 is slidably supported on a pair of supporting rails 121, 122, one end of each of which is supported in the side wall 123 of the housing, and the opposite ends thereof being supported in the boss 117. As best shown in Figure 3, each of the rails 121 and 122 is held against axial movement by a threaded bushing 125 that is adjustable within a recess 126 in the housing and secured to the rails by a bolt 127.

The yoke 115 is shifted by moving the gear shift lever 110 laterally when in neutral position, through a path defined by a laterally extending slot 129 in a quadrant or guide plate 131 supported on a frame 132 bolted as shown at 133 to studs 134 preferably formed integral with and extending upwardly from the cover plate 112 as shown in Figure 1. The gear shift lever has a ball portion 136 disposed thereon at a point spaced upwardly from the lower end thereof and below the ball and socket connection 113 of the lever with the cover plate 112, and such ball portion 136 engages between the upwardly extending arms 115a and 115b of the yoke 115, as best shown in Figure 1, when the gear shift lever 110 is positioned at any point in the path defined by the slot 129.

When the gear shift lever 110 is in the position shown in Figure 1, which is at one end of the path defined by the transverse slot 129, the pinion 52 is in mesh with the gear portion 47 of the compound gear 45 and is driven through the under-drive connection, that is, at a slower rate than the driving shaft 21. If the gear shift lever 110 be now moved laterally to the left through the slot 129 to a point adjacent the opposite end of such slot, the yoke 115, shaft 116 and shifter fork 118 will be moved by the lever toward the right, and in such movement the shifter fork 118 will move the pinion 52 out of engagement with the gear portion 47 and into direct clutching engagement with the driving gear 30. In both of such positions of the gear shift lever 110 and so long as the lever is not moved forward or rearward from the path of the slot 129, the transmission remains in neutral since the driving pinions 60 and 61 remain out of mesh with their companion pinions 62 and 63, respectively, and therefore do not complete the drive connection with the differential.

The slidable pinions 60 and 61 are controlled by the gear shift lever 110 by means which will now be described. The pinion 60 is shifted by a gear shifter 141 slidably mounted on the supporting rail 122 at one side of the yoke 115 and provided with a bifurcated plate 142 that engages in a groove 143 formed in the hub of the pinion 60. The pinion 61 is shifted by a gear shifter 146, slidably mounted on the supporting rail 121 at the opposite side of the yoke 115 from the gear shifter 141, and the gear shifter 146 is provided with a bifurcated plate 147 that engages in a groove 148 formed in the hub of the pinion 61, all as best shown in Figure 1. As also shown in Figure 1, the gear shifter 141 is provided with a pair of laterally spaced yokes or sockets 151 and 152, while the gear shifter 146 is provided with a pair of laterally spaced yokes or sockets 153 and 154, the socket 153 being approximately twice as deep as the socket 154. A ball 156 is provided on the lower end of the gear shift lever 110, as best shown in Figure 2, and is adapted to be shifted into any one of said sockets before the gear shifters are moved along the rails 121, 122 in the gear shifting operation, depending on the speed at which it is desired to drive the tractor. As best shown in Figure 1, the guide plate 131 is provided with suitable fore and aft and transversely extending slots through which the upper end of the gear shift lever 110 is moved in the gear shifting operation, whereby the ball 156 at the lower end of the lever will be moved into the proper socket of each of the gear shifters 141 and 146, as will be pointed out hereinafter in connection with the general description of the operation of the gear shifting mechanism.

Referring to Figure 3, a pair of longitudinally spaced recesses or notches 158 is provided in the supporting rail 122 and a spring pressed plunger 159 carried in a housing portion 160 of the shifter fork 118 is adapted to cooperate with said notches to yieldingly hold the shifter fork in either of its two adjusted positions that have been above referred to. Similarly, a pair of notches or recesses 162 is provided in the rail 122 that cooperate with a spring pressed plunger 163 carried in a housing portion 164 of the shifter fork 141 to yieldingly hold the shifter fork in either of its two adjusted positions as will be hereinafter described, and three notches or recesses 166 are provided in the rail 121 that cooperate with a spring pressed plunger 167 carried in a housing portion 168 of the shifter fork 146 to yieldingly hold the latter in any of its three adjusted positions as hereinafter referred to.

The operation of the transmission mechanism so far described is substantially as follows:

The splined shaft 35 may be driven at two different speeds, depending on whether the pinion 52 engages the gear 47 or the driving gear 30. Figure 1 shows the splined shaft 35 arranged to be driven at a lower speed than the driving shaft 21, since the pinion 52 is in engagement with the gear 47, in which position the shaft 35 is driven through the under-drive gear assembly. When the pinion 52 is shifted to the right, Figure 1, by swinging the lever 110 to the left, the clutch teeth 54 on the pinion 52 engage the clutch teeth 31 on the driving gear 30 to connect the shafts 21 and 35 directly at a one-to-one ratio.

The drive from the two speed splined shaft 35 is transmitted to the ring gear 65 of the differential 9, either through the pinion 60 or the pinion 61, and said pinions are also controlled by the shifting lever 110. As it is believed that the operation of shifting the pinions 52, 60 and 61 into their several positions to drive the ring gear 65 of the differential at either of its four forward speeds or in reverse by the shifting of the lever 110 will be best understood by describing the various movements of the shifting lever to produce such drives, such operation will now be described.

With the parts in the positions shown in Figure 1, the gear shift lever 110 is at the right hand end of the transverse slot 129 and the pinion 52 is in mesh with the gear 47 whereby the shaft 35 is being driven through the under-drive from the gear 30, thus driving the shaft 35 at its slowest speed. To drive the tractor at the lowest available forward speed, the gear shift lever 110 is moved rearwardly through the fore and aft extending slot 171, which disconnects the ball 136 from between the arms 115a and 115b of the yoke 115 and moves the ball 156 at the lower end of the lever 110 into the deep socket 153 of the gear shifter 146. The lever 110 is then moved to the right in the transversely extending slot 172 at the rear end of the slot 171, thus moving the gear shifter 146 to the left whereby the gear 61 connected to the gear shifter 146 will be moved into engagement with the pinion 63, and as the pinion 63 is formed integral with or connected to the pinion 66 that is in mesh with the ring gear 65 of the differential mechanism, such mechanism will be driven at first or low speed.

When it is desired to drive the differential mechanism at the next higher or second speed, the lever 110 is first moved from its position in the right hand end of the transverse slot 172 toward the left until it reaches the path of the fore and aft extending slot 171, then forwardly in the slot 171 to the path of the slot 129 where the ball 136 is again brought into position between the arms 115a and 115b of yoke 115, then to the left in the slot 129 and into the fore and aft extending slot 173, and during the movement of the lever 110 toward the left in the slot 129 the yoke 115 is moved toward the right to thereby move the pinion 52 to the right out of engagement with the gear 47 of the under-drive gear 45 and into direct clutching engagement with the gear 30 on the drive shaft 21, whereby the shaft 35 will be driven at a higher speed than when the pinion 52 is in mesh with the gear 47. The lever 110 is then moved rearwardly in the fore and aft extending slot 173, which movement disengages the ball 136 from between the arms 115a and 115b of the yoke 115 and moves the ball 156 at the lower end of the lever into the notch 154 of the gear shifter 146. The lever is then moved toward the right in the transverse slot 174, which moves the gear shifter 146 toward the left and shifts the pinion 61 connected thereto into engagement with the pinion 63, thus acting through the pinion 66 formed integral with the pinion 63 to drive the ring gear 65 of the differential mechanism that is in mesh therewith at second speed.

When it is desired to drive the differential mechanism at the next higher, or third speed, the lever 110 is moved toward the left in the slot 174 and forwardly in the slot 173, to the right through the slot 129, forwardly in the slot 171, and toward the right in the slot 175. As the lever 110 is moved into the path of the slot 129 the ball 136 engages between the arms 115a and 115b of the yoke 115, and as the lever is moved to the right hand end of the slot 129 the ball 136 acts to move the yoke 115 and the gear shifter 118 secured thereto toward the left to move the pinion 52 out of direct engagement with the gear 30 and into mesh with the gear 47 of the under-drive. As the lever 110 is moved forward in the slot 171 the ball 136 is moved out of engagement with the arms 115a and 115b of the yoke 115, and the ball 156 is moved into the socket 151 of the gear shifter 141. Thereafter, as the lever 110 is moved toward the right in the slot 175 the pinion 60 is moved by the gear shifter 141 into engagement with the pinion 62, driving the ring gear 65 of the differential mechanism at third speed through the pinion 66 formed integral with the pinion 62.

The fourth or highest speed is obtained by moving the lever 110 to the left out of the slot 175, rearward in the slot 171 and to the left through the slot 129 to the slot 173, forward in said slot to the slot 176, and to the right in the slot 176. As the lever 110 is moved rearwardly in the path 171 to the path 129 the ball 136 on the lever engages between the arms 115a and 115b of the yoke 115, and as the lever 110 moves toward the left in the slot 129, the ball 136 moves the yoke 115 and the gear shifter 118 connected thereto to the right to thereby move the pinion 52 connected to the gear shifter 118 out of engagement with the gear 47 and into direct clutching engagement with the gear 30 on the drive shaft 21, thus driving the shaft at a higher rate of speed than it is driven in the third speed arrangement. As the lever 110 is moved forward in the slot 173 the ball 136 is disconnected from the yoke 115, and the ball 156 on the lower end of the lever is moved into the socket 152 of the gear shifter 141. Thereafter, as the lever is moved toward the right in the slot 176 the pinion 60 is moved by the gear shifter 141 into engagement with the pinion 62 and through the pinion 66 formed integral with the pinion 62 driving the ring gear 65 of the differential mechanism at fourth speed.

Reverse drive is obtained by moving the lever 110 from its neutral position at either end of the transverse slot 129 to the right hand end of such slot to move the gear shifter 118 to the left to bring the pinion 52 into mesh with the gear 47, whereby the shaft 35 will be driven from the drive shaft 21 at the low speed obtained through the under-drive connections, thereafter moving the lever 110 rearwardly in the slot 171 to disconnect the ball 136 on the lever 110 from between the arms 115a and 115b of the yoke 115 and to move the ball 156 at the lower end of the lever 110 into the socket 153 of the gear shifter 146, and then moving the lever 110 to the left in the transverse slot 172 to thereby move the gear shifter 146 to the right to move the pinion 61 connected to the latter to the right into mesh with the ring gear 65. With this connection of the parts the compound pinion, comprising the pinions 62, 63 and 66, is not connected with any other gear but is driven idly by virtue of the constant engagement of the driving pinion 66 with the ring gear 65.

It is to be noted that both in first speed and in reverse the ball 156 on the lower end of the lever 110 occupies the socket 153, and, therefore, in order to provide separate slots 172 and 174 on the shifter guide plate 131, the socket 153 is made twice as deep as the other sockets 151, 152 and 154 so that the reverse guide slot 172 may be positioned rearwardly of the second speed guide slot 174.

As shown in Figure 2, a power take-off shaft 200 is disposed in the lower portion of the frame housing 2 and is positioned to extend longitudinally of the tractor between the drive gears 79 on the inner ends of the axles or drive shafts 80. The rear end of the power take-off shaft is journaled in a bearing 202 mounted in a sleeve 203 formed integral with and extending rearwardly from the rear cover plate 15. The forward end of the shaft is splined and connected by a splined sleeve 204 to a relatively long hub member 205 of a bevel gear 206, said hub member being journaled in bearings 207 mounted in a longitudinal boring provided in an upstanding lug 208 preferably, but not necessarily, formed integral with the bottom wall of the housing 2. The bevel gear 206 meshes with a bevel gear 210 (Figure 1) which is mounted on a transversely extending jack shaft 211, the gear being keyed to the shaft as shown at 212 to rotate therewith. The jack shaft 211 is disposed in parallelism with respect to the shafts 35 and 36 and is journaled in a bearing 213 carried in one wall of the housing 2 and a bearing 214 carried by a lug 215 extending upwardly from the bottom of the housing 2. The shaft 211 at one side of the bevel gear 210 is splined, as indicated at 216, and a pinion 217 is slidably but non-rotatably mounted on such splined portion and is provided with a grooved hub 218 engaged by a shifter element 221 by which the position of the pinion on the shaft 211 is controlled. The pinion 217 may be shifted into or out of mesh with the gear section 46 of the compound gear 45 and when the pinion 217 is meshed with the gear 46 the shaft 211 is driven, and when the latter is rotated, the bevel gears 206 and 210 transmit power to the power take-off shaft 200 for the purpose of transmitting the drive to operating units associated with the tractor.

While we have shown and described above the preferred structure in which the principles of the present invention have been embodied, it is to be understood that our invention is not to be limited to the specific details shown and described, but that, in fact, widely different means may be employed in the practice of the broader aspects of our invention.

We claim:

1. In a transmission, a housing; a pair of stationary rails mounted in parallelism therein, a shift rail movably mounted therein intermediate said stationary rails and parallel thereto, a shiftable member supported for sliding movement on the two outer rails, a pair of oppositely disposed shiftable members slidable, respectively, on said outer rails, means fixing the intermediate rail to said first mentioned shiftable member, a yoke fixed to said intermediate rail between said last mentioned shiftable members, said yoke and intermediate rail being shiftable relative to the outer rails from one position to another and said pair of opposed shiftable members having pairs of sockets disposed opposite said yoke in each of the positions of said intermediate rail, a gear shift lever having its lower end engaged in said yoke for shifting said intermediate rail from one position to another and adapted in either position to be disengaged from said yoke and to engage either of said pair of shiftable members, a plurality of sets of gears controlled by said pair of shiftable members, and gear means controlled by said first mentioned shiftable member for controlling the ratio at which said sets of gears may be driven.

2. In a transmission, a pair of stationary rails, a third rail disposed between said pair of stationary rails and movable from one position to another, each of said pair of stationary rails having a shiftable member slidable thereon, one movable from one position and the other movable from a neutral position in opposite directions to each of two optional positions, each shiftable member having a pair of spaced sockets facing said intermediate rail and spaced apart a distance corresponding to the movement of said intermediate rail from one position to another, a yoke carried by said intermediate rail between said shiftable members and having a socket adapted to be in register with opposed sockets on said shiftable members, one of the sockets on the shiftable member of one of said stationary rails being deeper than the other sockets, a gear shift lever having its lower end disposed in the socket of the yoke on said intermediate rail and movable therefrom in either position of the intermediate rail into either of the sockets adjacent the yoke in that position of the intermediate rail, and a slotted gate for the gear shift lever, the slots in said gate providing for movement of the lower end of the gear shift lever from the socket in said yoke into either of the sockets on the shiftable members, there being lateral slots in said gate accommodating the movement of said gear shift lever when in engagement with said deeper socket for moving the associated shiftable member in either direction from its neutral position.

3. In a transmission, a shiftable member movable into either of two positions, a gear shift lever engageable with and disengageable from said member for moving the latter into either of its positions, a pair of gear shifter members each movable into either of two positions and disposed on opposite sides of said shiftable member and each having two spaced sections so that when the gear shift lever is in engagement with said shiftable member one or the other of said sections will receive said gear shift lever when the latter is moved laterally from either position of said shiftable member, whereby after the latter has been shifted into either of its positions said lever can be optionally moved laterally into any one of several positions to shift either of said gear shifter members out of its neutral position into a selected position, and a slotted gate for guiding said gear shift lever having a slot through which said lever moves in shifting said shiftable member into either of its positions, a transverse slot at each end of said first mentioned slot to accommodate the movement of said shift lever into engagement with one or the other of said gear shift members from either position of said shiftable member, and parallel slots extending from the ends of said transverse slots to accommodate the movements of said lever when shifting said gear shifter members.

4. In a transmission, a pair of outer rails, a third rail disposed between said pair of rails, a shiftable yoke member mounted on each of said rails, the yoke members on the outer rails each having a pair of spaced sockets facing the intermediate yoke member and the latter having one socket adapted to be moved into register with either of the sockets on either of the outer yoke members when the latter are in their neutral position, one of the sockets on one of the outer yoke members being deeper than the other sockets of the outer yoke members, a gear shift lever having one end disposed in the socket of the intermediate yoke member and movable therefrom into engagement with a selected socket on either of the outer yoke members, the yoke member having the deeper socket being movable into two opposite positions from a neutral position when said gear shift lever engages the deeper socket.

5. In a transmission, a shiftable member movable into either of two positions, a gear shift lever mounted for universal swinging movement about a point of support spaced from said member, one end of the lever being engageable with the latter for shifting the same into either of its positions, said lever being disengageable from said member by moving it in either direction at right angles to said shifting movement, a pair of gear shifter members each movable into either of two positions and disposed on opposite sides of said shiftable member and each having two spaced sockets so that when the gear shift lever is in engagement with said shiftable member one or the other of said sockets will receive said gear shift lever when the latter is moved out of engagement with the shiftable member in either direction, from either position of the latter, whereby after the latter has been shifted into either of its positions said lever can be optionally moved laterally into any one of several positions to shift either of said gear shifter members out of its neutral position into a selected position, and a slotted gate for guiding said gear shift lever having a slot through which said lever moves in shifting said shiftable member into either of its positions, a transverse slot at each end of said first mentioned slot to accommodate the movement of said shift lever into engagement with one or the other of said gear shift members from either position of said shiftable member, and parallel slots extending from the ends of said transverse slots to accommodate the movements of said lever when shifting said gear shifter members.

6. In a transmission, a first shiftable member movable into either of two positions, a shift lever engageable with and disengageable from said member for moving the latter into either of said positions, a second shiftable member disposed adjacent said first member and having means engaged by said first lever after the latter has been disengaged therefrom in either of said positions, and whereby said second member can be shifted along a line parallel to the line of movement of said first member in either direction, the path of movement of said shift lever from said first member in one position to move said second member in one direction overlapping the path of said lever from the other position of said first shiftable member to move the second member in the other direction, and a gate member having parallel guides for guiding said lever in said overlapping paths of movement, said guides being laterally offset from each other to separate said paths.

7. In a transmission, a shifting lever, a first shiftable member movable into either of two positions and having a socket for receiving said shifting lever, the latter being movable out of said socket in either position of the member, a second shifting member disposed adjacent said first member and shiftable parallel to the line of movement of said first member into either of two positions, said second member having a pair of spaced sockets for receiving said lever from said socket in said first member in either position of the latter, respectively, and a gate member having slots for guiding said lever in movements from either position of said first member to opposite positions of said second member, respectively, said guide slots being overlapping and spaced laterally to separate said paths of movement, one of said sockets in said second member being adapted to receive said lever at a deeper position than the other.

JAMES S. ROSS.
WAYNE H. WORTHINGTON.